United States Patent [19]
Katoh

[11] Patent Number: 5,522,655
[45] Date of Patent: Jun. 4, 1996

[54] RUBBER CRAWLER

[75] Inventor: Yusaku Katoh, Hiroshima-ken, Japan

[73] Assignee: Fukuyama Gomu Kogyo Kabushiki Gaisha, Hiroshima, Japan

[21] Appl. No.: 318,812

[22] PCT Filed: Apr. 26, 1993

[86] PCT No.: PCT/JP93/00541

§ 371 Date: Oct. 19, 1994

§ 102(e) Date: Oct. 19, 1994

[87] PCT Pub. No.: WO93/22184

PCT Pub. Date: Nov. 11, 1993

[30] Foreign Application Priority Data

Apr. 30, 1992 [JP] Japan .................. 4-041362 U

[51] Int. Cl.⁶ .................................................. B62D 55/24
[52] U.S. Cl. ............................................... 305/174; 305/167
[58] Field of Search ............................. 305/35 R, 35 EB, 305/38, 56, 57

[56] References Cited

FOREIGN PATENT DOCUMENTS

| 1173091 | 5/1988 | Japan . | |
| 4133878 | 5/1992 | Japan | 305/35 R |
| 4342680 | 11/1992 | Japan | 305/38 |
| 6087473 | 3/1994 | Japan | 305/35 EB |

*Primary Examiner*—Russell D. Stormer
*Attorney, Agent, or Firm*—Lane, Aitken & McCann

[57] ABSTRACT

The present invention relates to a rubber crawler wherein a core bar having an engaging part at the central position along its length is provided with at least one horizontal projection to each of widthwise side faces of the engaging part at the almost same level as wing portions of the core bar, said horizontal projections projecting in a direction normal to the side faces of the core bar, said core bars are embedded in the crawler main body at equal intervals in a circumferential direction of the crawler so that confronting horizontal projections overlap each other in a widthwise direction of the core bar 1, and tips of the confronting horizontal projections between the embedded core bars are in a three-dimensionally overlapped state in which they overlap each other over a certain length thereof in left and right directions as well as upward and downward directions.

48 Claims, 9 Drawing Sheets

RUBBER CRAWLER

FIELD OF THE INVENTION

The present invention relates to a rubber crawler to be attached to an under-carriage of a traveling construction machine.

BACKGROUND OF THE INVENTION

Steel caterpillers have usually been attached to the under-carriages of traveling construction machines, but in recent years rubber crawlers have been applied as well.

FIG. 8 shows a conventional rubber crawler 16 on which an inner flanged inner-flanged idler wheel 19 is rolling. The reference numeral 11 is a core bar. The reference numeral 12, 13 and 14 indicate a wing portion, a protruding part to prevent disengagements of a wheel, and an engaging part with a driving wheel, respectively, all of the core bar 11. The numeral 17 is a steel cord, 18 is an engaging hole, 19c is a center rolling part of the idler wheel 19. As shown in this figure, the center rolling part 19c travels between the protruding parts 13, 13 so that disengagements of the wheel can be prevented.

Compared with a steel crawler, the above rubber crawler has the disadvantage that disengagements of the crawler may easily happen. This is mainly because the rubber crawler is partially twisted to thereby disengage from the wheel, when it turns on a stepped ground in the workshop. FIG. 9 shows a disengagement of the wheel. The crawler is slided sideways between the adjacent core bars 11, 11, and therefore the center rolling part 19c of the inner-flanged idler wheel 19 runs on the protruding part 13, thereby causing the disengagement of the wheel from the crawler.

To overcome this problem, increasing the widthwise strength of the rubber crawler may be considered.

Then, if the interval of core bars in the rubber crawler is narrowed as the width thereof is broadened in order to increase the strength of the rubber crawler, the widthwise edge portions of each core bar become angulate at their turning points, which places the rubber crawler in a polygonal shape. Accordingly, the rubber crawler suffers much bending fatigue, and therefore its durability decreases.

On the other hand, if a short-pitched rubber crawler (wherein the core bars' interval is half of the conventional rubber crawlet's core bar interval by embedding core bars of narrower width arranged for the interval) is applied in order to increase the strength, it is excellent in preventing disengagements of the wheel because of the narrower interval of the embedded core bars than in a conventional rubber crawler's, and is excellent in the durability as well. However, this has not become a perfect means yet, but still causes disengagements of the crawler in a large-sized construction machine.

FIGS. 10A and 10B show the core bars 11 vibrating in a circumferential direction in the conventional rubber crawler for an inner-flanged wheel for an inner-flanged wheel. As shown in FIG, 10A, when an outer force such as a load of the wheel is imposed on the top edge portion of the protruding part 13, the core bar 11 is displaced as shown in a dotted line 13'. Accordingly, the wheel falls between the protruding parts 13 and 13 , which causes traveling vibrations of the wheel. As shown in FIG. 10B, when the protruding part 13 is pushed by an ourter force F' from the outside, the core bar 11 is displaced as shown in a dotted line 13". Such an outer force F' happens when some stones are pushed into a space between the protruding parts 13 and 13, or when chassis hook the side upper portion of the protruding part 13 due to disorders of the rubber crawler device. In this case, the core bar is pulled out at a stroke, or gradually separates from an adherent face with gum to fall off. These vibrations of the core bars are caused by the construction that each core bar receives a partial outer force nearly individually. For this solution, providing some effective connecting means between the adjacent core bars is considered.

SUMMARY OF THE INVENTION

Therefore, objects of the present invention are to overcome the above problems, to provide a rubber crawler for an inner-flanged wheel for an inner-flanged wheel which is free from partial slidings of the crawler and vibrations of the core bar, and to prevent disengagements of the wheel from the crawler as well as to prevent the core bars from separating from gum so as to increase the durability.

FIGS. 1~7 are refered for an easy understanding of the following description. However, it is intended that these figures are illustrative only.

First, the present invention is characterized by a rubber crawler wherein a core bar having an engaging part at the central position along its length is provided with at least one horizontal projection to each of widthwise side faces of the engaging part at the almost, same level as wing portions of the core bar, said horizontal projections projecting in a direction normal to the side faces of the core bar, said core bars are embedded in the crawler main body at equal intervals in a circumferential direction of the crawler so that confronting horizontal projections overlap each other in a widthwise direction of the core bar, and tips of the confronting horizontal projections between the embedded core bars are in a three-dimensionally overlapped state in which they overlap each other over a certain length thereof in left and right directions as well as upward and downward directions.

As the first embodiment as shown in FIGS. 1~4, a tip central position of a horizontal projection of a core bar is caved into a cave s, while a tip of a confronting horizontal projection of an adjacent core bar is provided with a nipple t to enter into said cave s.

As the second embodiment as shown in FIGS. 5~7, a horizontal projection of a core bar is formed to be sectionally concave or L-shaped, while a confronting horizontal projection of an adjacent core bar is formed to be sectionally convex, L-shaped, or stick-shaped so as to enable a three-dimensionally engaged and overlapped state with each other.

It is preferable that bottom faces of the engaging part of the core bar and both ends thereof are thickened to be somewhat lower than the wing portions of the core bar, and that the above-mentioned horizontal projections are provided to the thickened portions.

Besides as shown in FIG. 7, it is preferable that long slender concave grooves U or/and U' are provided to either one of or both of a grounding face and a nongrounding face of the rubber crawler at somewhat outer positions to the side faces of the rubber crawler from the overlapped portion of the horizontal projections between the core bars embedded in the rubber crawler body, and that said concave grooves U or/and U' are partially along a circumferential direction of the rubber crawler.

Furthermore, it is preferable that a part of a rubber layer on the overlapped portion of the horizontal projections between the core bars embedded in the rubber crawler body and its vicinities is partially removed on either one of or both of the grounding face and the nongrounding face so that the overlapped portion of the horizontal projections is exposed or covered with a thin rubber layer.

In thus constructed rubber crawler, regardless of any outer force to separate the embedded core bars imposed thereon, the tip portions of the confronting horizontal projections of the adjacent core bars are in contact with each other over a certain length in three-dimensional directions of right, left and upward, downward directions. Accordingly, no disengagements of the wheel from the crawler occur. Besides, because the horizontal projections are provided at almost the same level as wing portions of the core bar near a layer of steel cords, there is no bit change of the overlapped space of the horizontal projections even when the rubber crawler is bent to a grounding side or nongrounding side. Especially in the rubber crawler wherein bottom faces of the engaging part of the core bar and both ends thereof are thickened, the horizontal projections are provided further close to the layer of steel cords, thereby effecting further small change of the overlapped space thereof. Besides, because the horizontal projections are provided at the almost same level as wing portions of the core bar near a layer of steel cords, there is no big change of the overlapped space of the horizontal projections, even when the rubber crawler is bent to a grounding side or non-grounding side. Especially in the rubber crawler wherein bottom faces of the engaging part of the core bar and both ends thereof are thickened, the horizontal projections are provided further close to the layer of steel cords, thereby effecting further small change of the overlapped space thereof. The rubber crawler shown in FIG. 7 can effectively prevent cracks, which occur due to long use of the crawler, from growing to steel cord's layer. The rubber crawler wherein a part of a rubber layer on the overlapped portion of the horizontal projections and its vicinities is partially removed can farther prevent the cracks themselves as much as possible.

BRIEF DESCRIPTION OF THE DRAWINGS

FIG. 1 relates to the first embodiment of a core bar for a rubber crawler according to this invention.

FIG. 3 shows a rubber crawler where the above core bars are embedded.

FIG. 4 shows effects to prevent vibrations of the core bar in the rubber crawler shown in FIG. 3.

FIG. 5 relates to the second embodiment of the core bar for the rubber crawler according to this invention.

FIG. 7 shows concave grooves provided to a grounding face and a non-grounding face of the rubber crawler where the above-mentioned core bars are embedded.

PREFERRED EMBODIMENTS OF THE PRESENT INVENTION

Figure 1A:
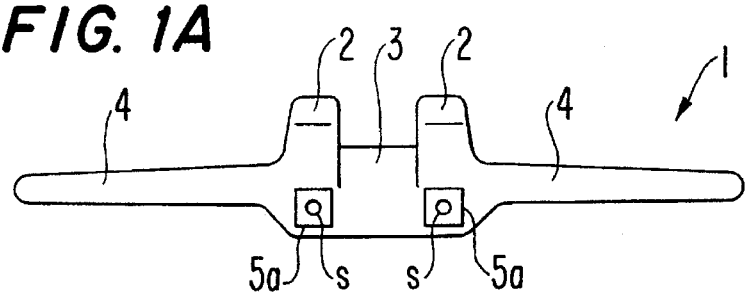
FIG. 1A is a front view.
Figure 1B:
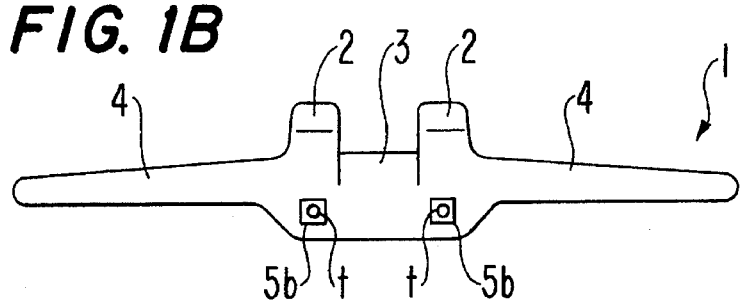
FIG. 1B is a back view.
Figure 1C:
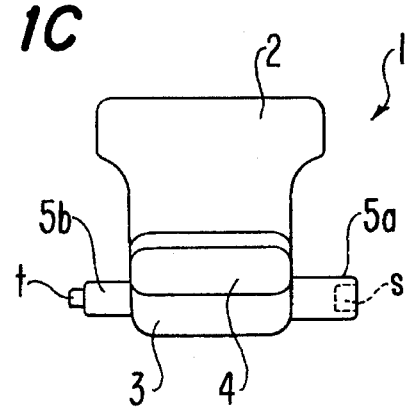
FIG. 1C is a left side view.
Figure 1D:
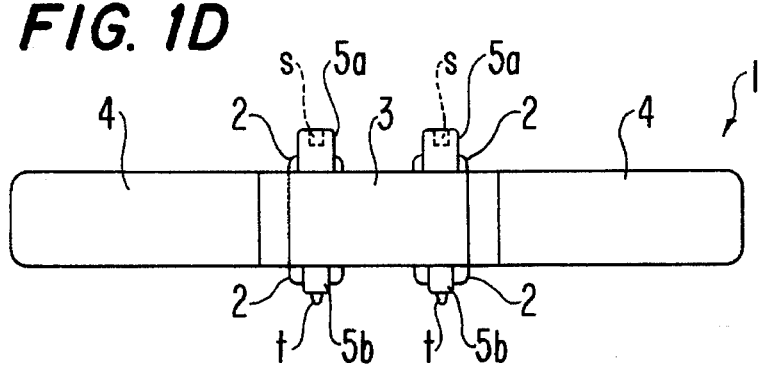
FIG. 1D is a bottom view.
Figure 2:
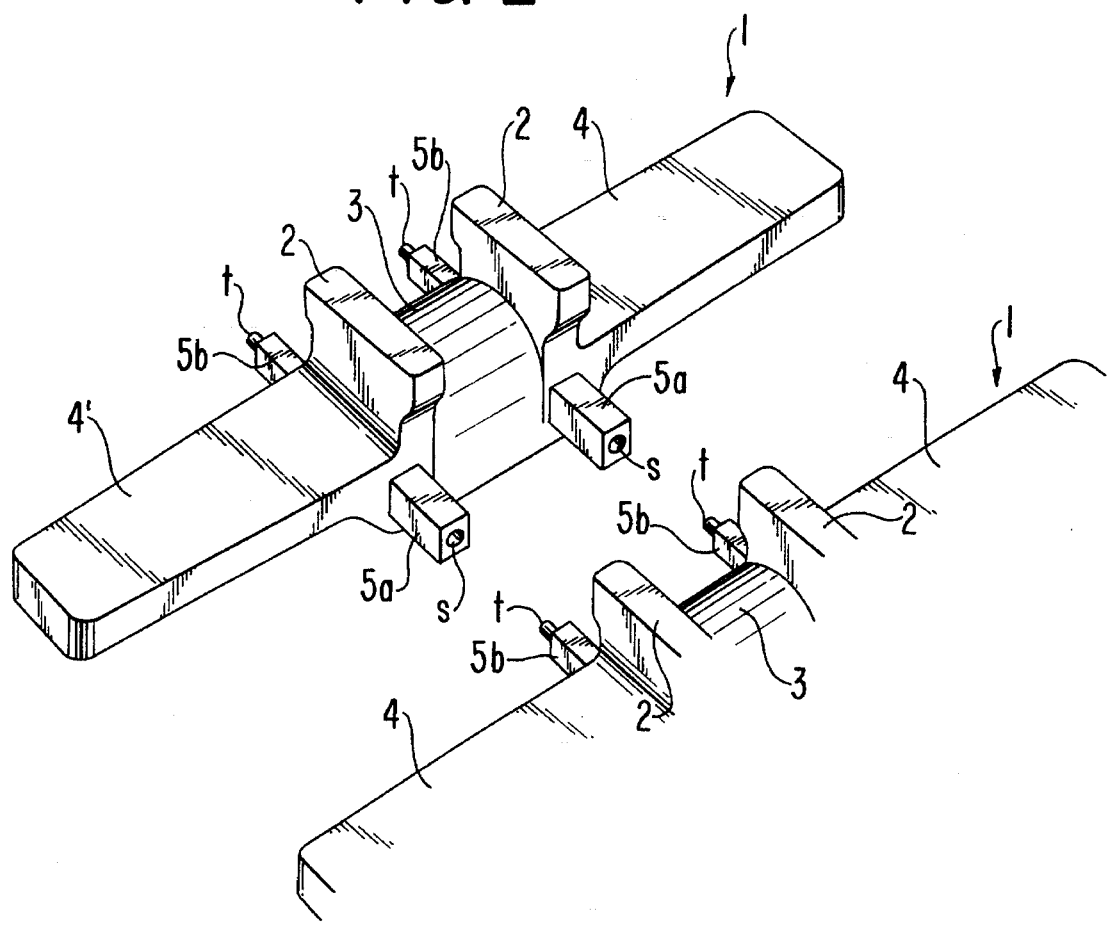
FIG. 2 is a perspective view of the core bar in FIG. 1.

The first embodiment of this invention is described with reference to FIGS. 1 through 4. The reference numeral 1 is a core bar, 2 is a protruding part as a track for an inner-flanged wheel, 3 is an engaging part with a driving wheel, 4 is a wing portion, 5a and 5b are horizontal projections. As shown in FIG. 1, on one side of the core bar the horizontal projections 5a, 5a are provided to both ends of the engaging part 3 whick is provided at the central position along the length of the core bar, while the horizontal projections 5b, 5b are provided to the same positions on the other side of the core bar. Said horizontal projections project in the widthwise direction of the core bar. The bottom face of the engaging part 3 and both ends thereof is thickened to provide the horizontal projections 5a, 5b as close as possible to the bottom face. The reference marks s and t are a cave and a nipple provided to the tips of the horizontal projections 5a, 5b, respectively. The nipple t is inserted into the cave s with a suitable opening. FIG. 2 is a perspective view of the core bar shown in FIG. 1, showing a relation of confronting horizontal projections of adjacent core bars.

Figure 3A:
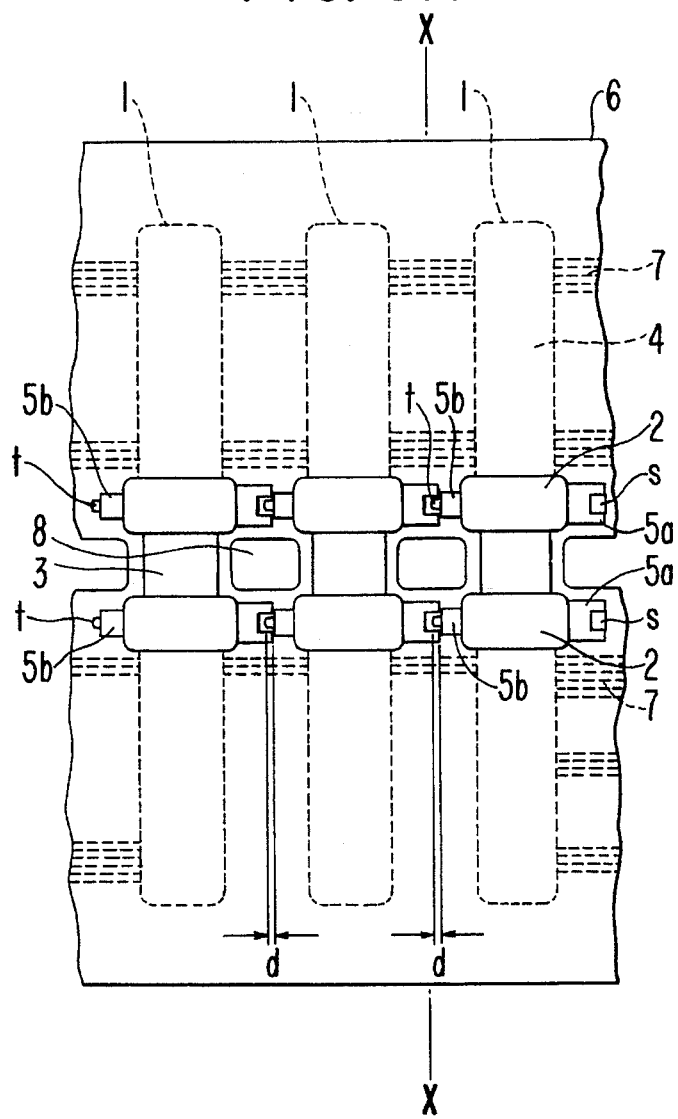
FIG. 3A is a plane view (on the grounding or the nongrounding side)
Figure 3B:
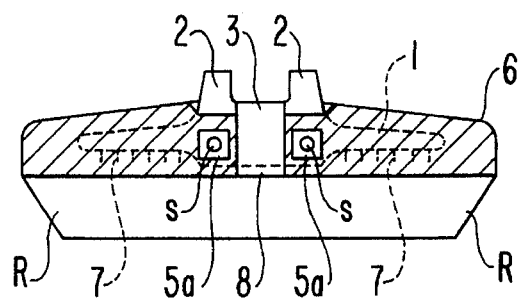
FIG. 3B is a sectional view along the line X—X in FIG. 3A.

FIGS. 3A and 3B show a rubber crawler 6 where the above core bars 1 are embedded; FIG. 3A is a plane view (on the nongrounding side), FIG. 3B is a sectional view along the line X—X in FIG. 3A. As shown in FIG. 3A, between adjacent core bars, the nipples t, t of the horizontal projections 5b, 5b of one core bar are inserted into the caves s, s of the horizontal projections 5a, 5a of the next core bar, so that the confronting horizontal projections can overlap each other over a space d when seen from the widthwise and thickness wise directions of the crawler. The horizontal projections 5a, 5b are provided to both ends of the engaging part so that they do not overlap a steel cords' layer 7. As shown in FIG. 3B, the horizontal projections 5a, 5b are provided as close as possible to the bottom face. Accordingly, they are embedded near a steel cords' layer 7, thereby causing no big change in the overlapped space of the horizontal projections, even if the rubber crawler bends to the nongrounding side or the grounding side. The reference numeral 8 is an engaging hole, and R is a lug.

Figure 4A:
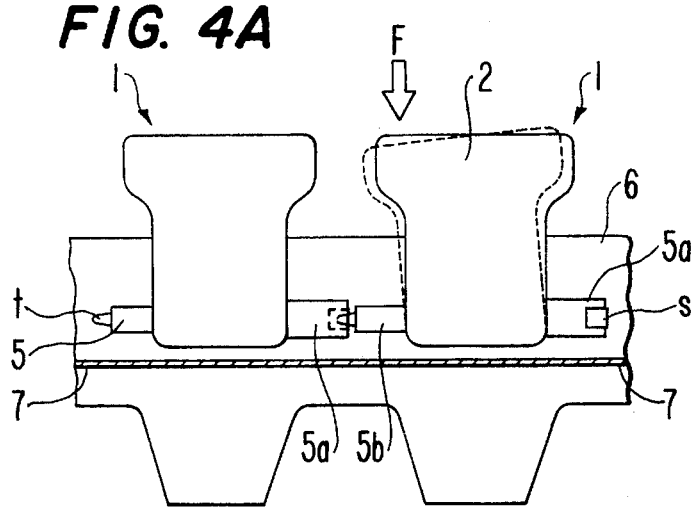
FIG. 4A shows a case that an outer force such as a load of a wheel is imposed on a top end position of a protruding part.
Figure 4B:
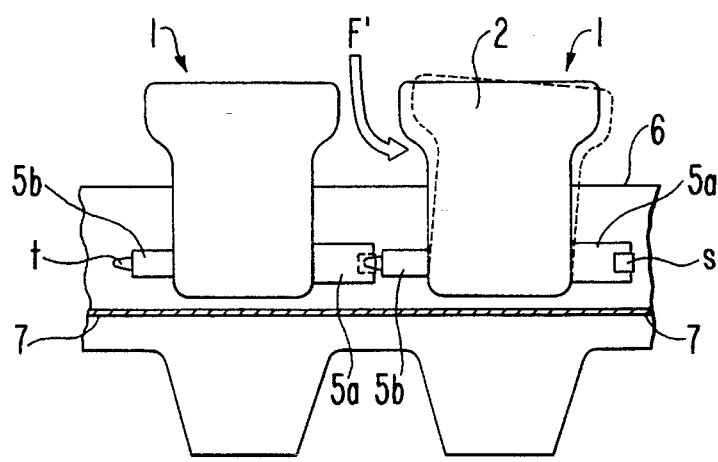
FIG. 4B shows a case that an outer force works to push the protruding part from the outside.
Figure 4C:
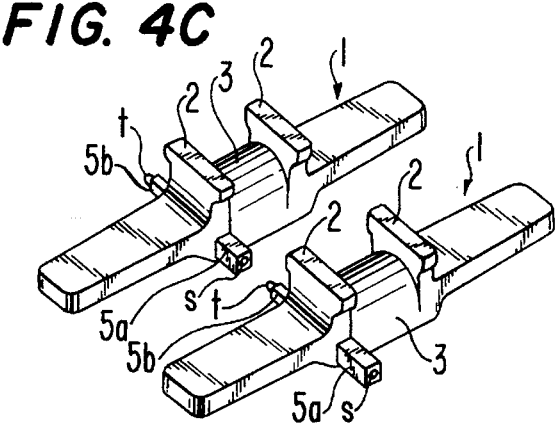
FIG. 4C is a perspective view of core bars for the rubber crawler according to the present invention, in which horizontal projections are provided at only one end of the engaging part on both sides of the core bars.

FIGS. 4A and 4B explain effects to prevent vibrations of the core bar in the rubber crawler 6; FIG. 4A shows a case that an outer force F such as a load of a wheel is imposed on a top end position of a protruding part 2, and FIG. 4B shows a case that an outer force F' works to push the protruding part 2 from the outside. As shown in each figure, since the nipple t of the horizontal projection 5b of one core bar is inserted into the cave s of the confronting horizontal projections 5a of the next core bar, the protruding part 2 is displaced only slightly as described by a dotted line 2 against the outer force F or F'. Accordingly, vibrations of the core bars 1 are prevented, thereby restricting collapses of a wheel between adjacent core bars extremely as well as preventing the core bars from separating from the rubber crawler. As shown in FIG. 4C, it is anticipated that the horizontal projections 5a, 5b are provided to only one end of the engaging part on both sides of the core bar, respectively, and that confronting horizontal projections overlap and engage with each other between adjacent core bars.

Figure 5A:
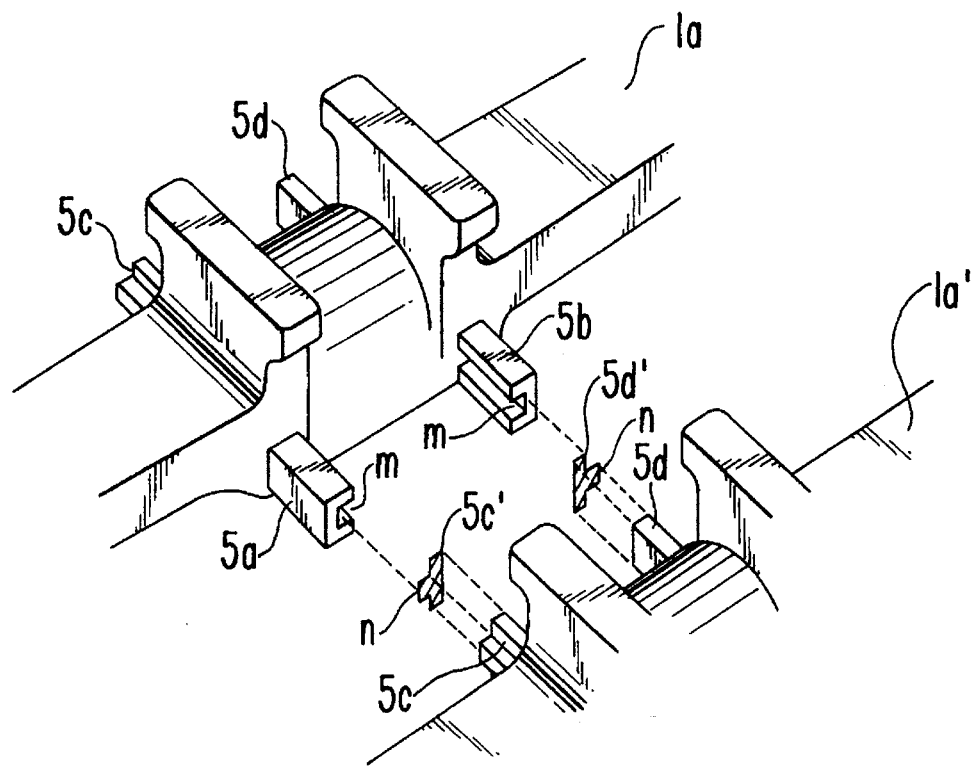
FIG. 5A is a perspective view and FIG. 5B is a perspective view of a core bar where the horizontal projections are arranged differently from those in FIG. 5A.
Figure 5B:
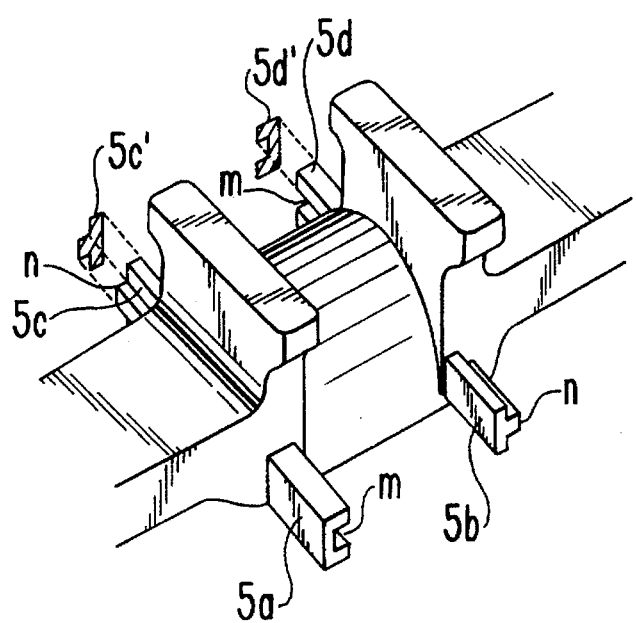

FIGS. 5A and 5B relate to the second embodiment of the horizontal projection. In FIG. 5A, each horizontal projection 5a, 5b, 5c, or 5d has a sectional shape of either a concave or a convex on its overlapped portion. As shown in this figure, the horizontal projections 5a and 5b of a core bar 1a are sectionally of a concave shape having an opening m, while the horizontal projections 5c and 5d of an adjacent core bar 1a' are of a convex shape having a projection n which is inserted into and engaged with said opening m. The reference marks 5'c and 5'd show sectional shapes of the horizontal projections 5c and 5d on their overlapped portions, respectively. FIG. 5B shows that the horizontal projections 5b and 5d shown in FIG. 5A are exchanged. The reference marks 5'c and 5'd are sectional shapes of the horizontal projections 5c and 5d on their overlapped portions, respectively. According to the embodiment shown in FIG. 5B wherein the disposition and shape of the right and left horizontal projections are equal on the both sides of the core bar, rubber crawlers are conveniently produced without any mistake in disposing core bars.

Figure 6A:
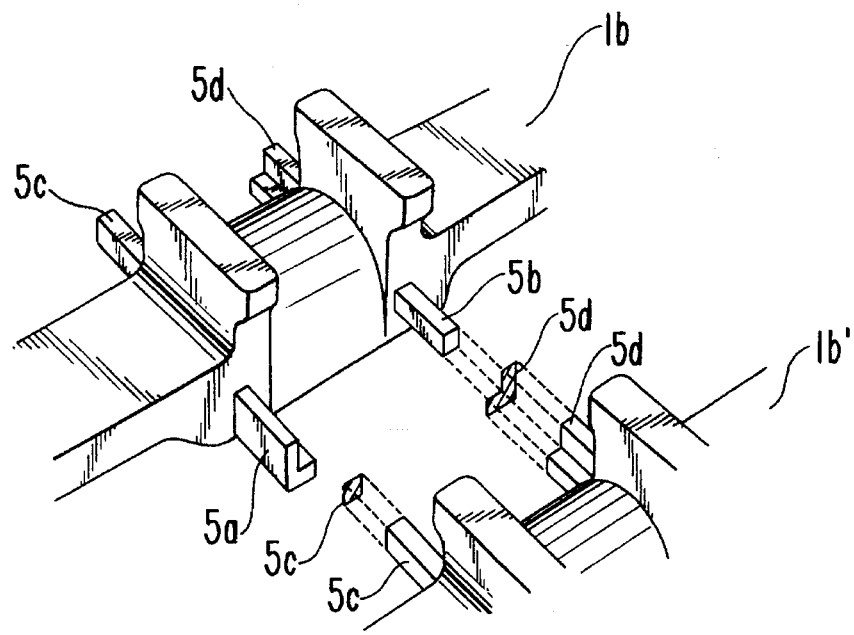
FIG. 6A shows a relation of confronting horizontal projections, and FIG. 6B explains effects to prevent vibrations of the core bar shown in FIG. 6A in the rubber crawler.
Figure 6B:
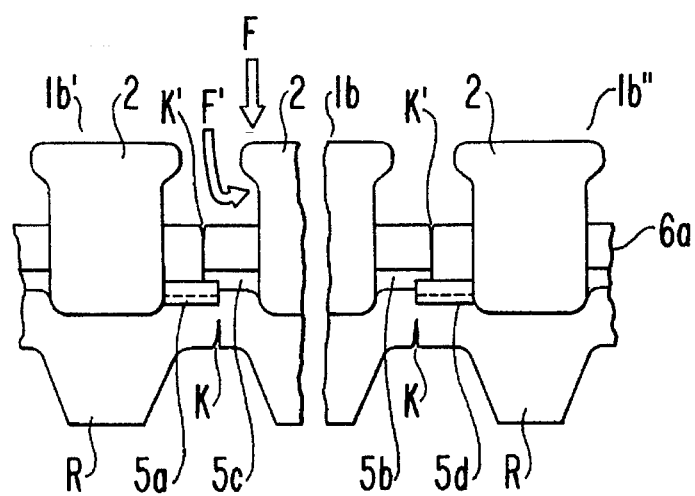
FIG. 6 relates to the third embodiment of the core bar.

FIGS. 6A and 6B relate to the third embodiment. As shown in FIG. 6A, a core bar is provided with a sectionally L-shaped horizontal projection 5a and a stick-shaped horizontal projection 5b on one side of the core bar, and with horizontal projections 5c and 5d of reverse shapes thereto on the other side. Since the proposition and shape of the right and left horizontal projections are equal on the both sides of the core bar this embodiment is also convenient in producing rubber crawlers like the above case. FIG. 6B explains effects to prevent vibrations of core bars embedded in the rubber crawler 6a. As shown in the figure, the horizontal projection 5c of a core bar 1b and the horizontal projection 5a of a core bar 1b' collide with each other to prevent vibrations against an outer force F, while the horizontal projection 5b of the core bar 1b and the horizontal projection 5d of a core bar 1b'' collide against an outer force F'.

In FIG. 6B, the reference marks K and K' are flaws on the grounding face and the nongrounding face of the rubber crawler 6a, respectively. Because of a stage difference on the outer periphery of the horizontal projections at their overlapped portions, the flaws K concentrate on the outer peripheral rubber of these portions. The flaws K' occur when a rubber layer in a minute space between upper and lower horizontal projections at the overlapped portions is continuously sheared and damaged. Both flaws K and K' grow in the widthwise and thicknesswise directions of the rubber crawler to reach the steel cords' layer 7. Consequently, water soaks from the road to corrode and degrade the steel cords thereby decreasing the durability of the rubber crawler.

Figure 7A:
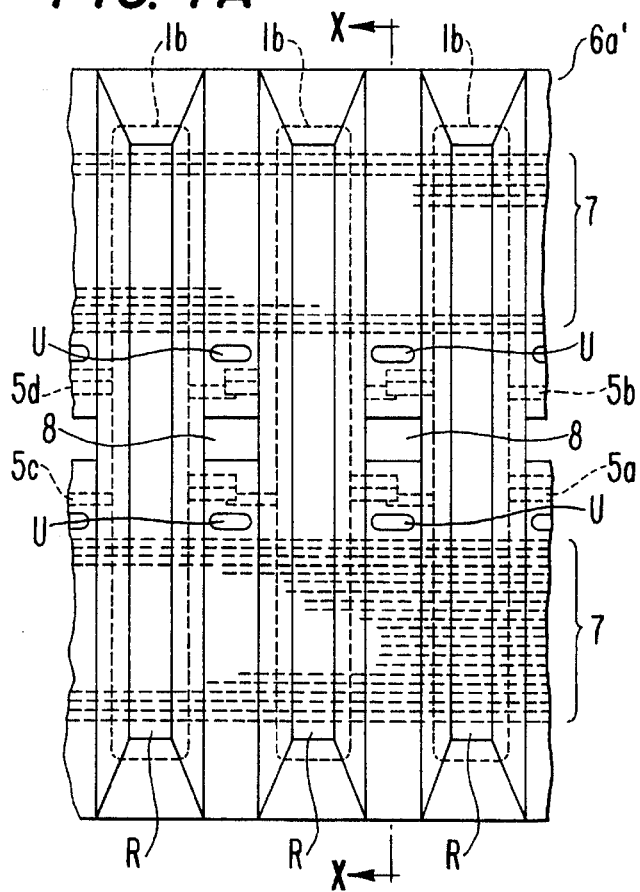
FIG. 7A is a plane view on the grounding face.
Figure 7C:
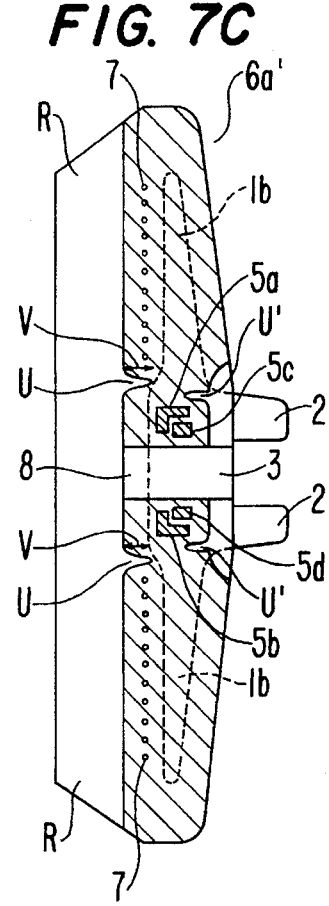
FIG. 7C is a sectional view along the line X—X in FIGS. 7A and 7B.
Figure 7B:
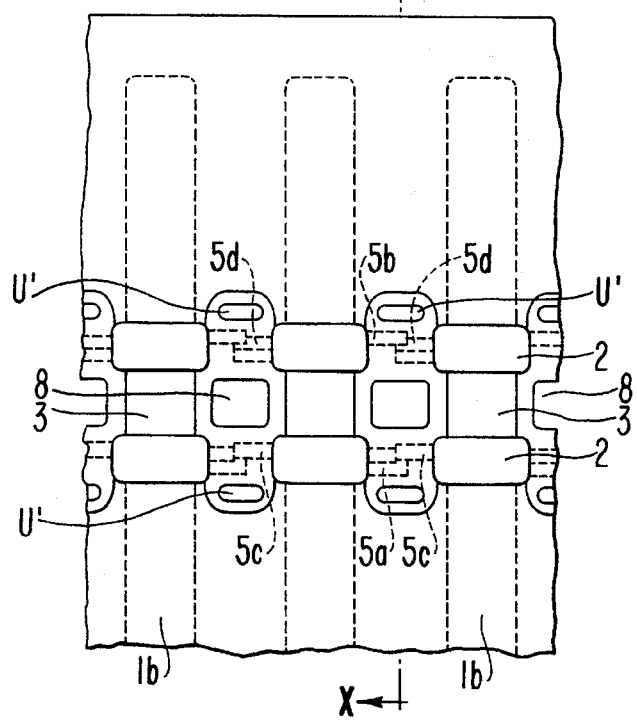
FIG. 7B is a plane view on the nongrounding face.
Figure 8:
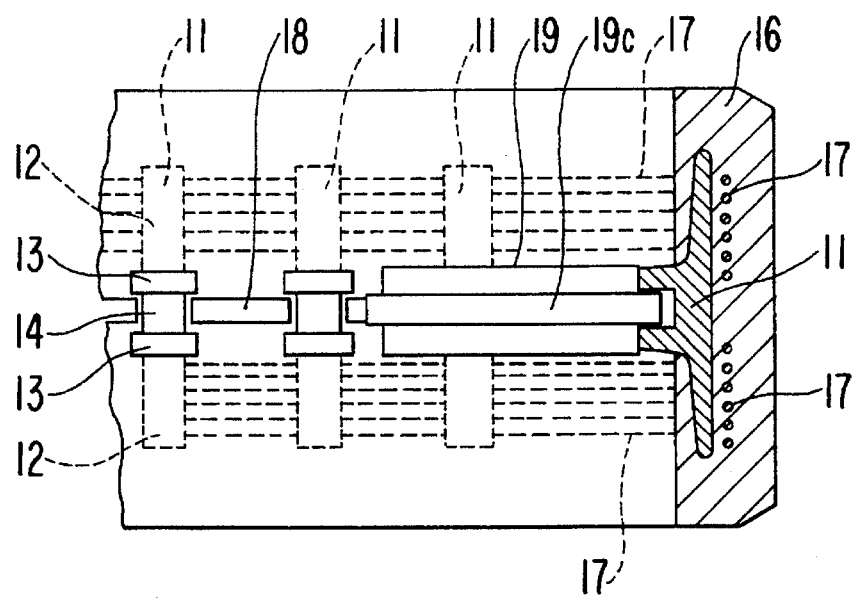
FIG. 8 relates to a conventional example, showing an engagement of a rubber crawler with an inner-flagged idler wheel.
Figure 9:
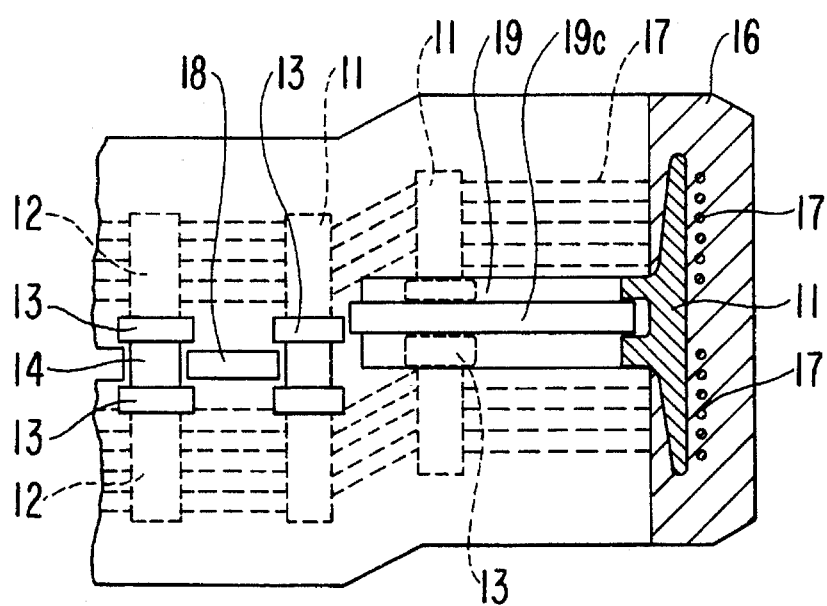
FIG. 9 also relates to the conventional example, showing a disengagement of the rubber crawler from the wheel.
Figure 10A:
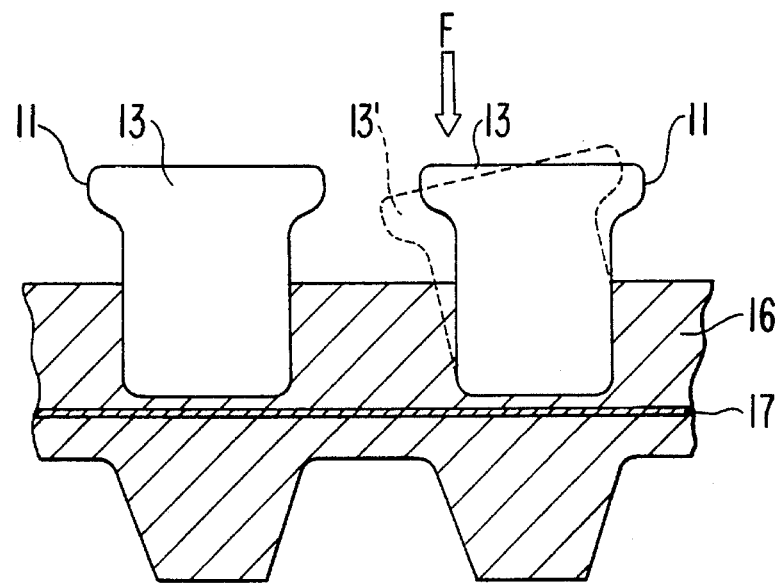
FIGS. 10A and 10B show core bars vibrating in a cirumferential direction in the conventional rubber crawler for the inner-flanged idler wheel.
Figure 10B:
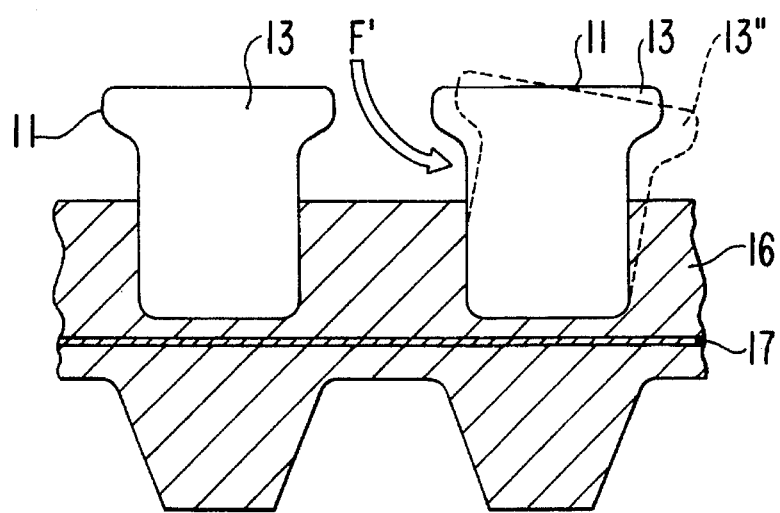

FIGS. 7A–7C show a rubber crawler 6a' provided with concave grooves U and U' for preventing the above problems on the outer periphery and the inner periphery, respectively; FIGS. 7A and 7B are plane views on the grounding side and the nongrounding side, respectively, and FIG. 7C is a sectional view along the line X—X in FIGS. 7A and 7B.

As shown in these figures, the concave grooves U and U' are provided at somewhat outer positions to the side faces of the crawler from the overlapped portions of the horizontal projections 5a, 5c, and the horizontal projections 5b 5b on the grounding side and the nongrounding side, respectively. Accordingly, even if the foregoing flaws K occur on the grounding side of the rubber crawler 6a, they do not reach the steel cords' layer, thereby preventing a decrease of the rubber crawler's durability.

It is intended that shapes of horizontal projections and combinations of confronting horizontal projections are not limited to the above embodiments, but that any shape and combination are available if confronting horizontal projections between embedded core bars are engaged with each other in a three-dimentional direction at their overlapped portions.

I claim:

1. A rubber crawler defining a circumferential direction and comprising a crawler main body defining a bottom side, and core bars each having a length, a widthwise direction, a central position along the length, wing portions, a pair of protruding parts to define a track for an inner-flanged wheel, an engaging part at the central position, the engaging part having widthwise side faces, at least one horizontal projection on each of the widthwise side faces of the engaging part at almost the same level as the wing portions of the core bar, said horizontal projections projecting in a direction normal to the widthwise side faces of the core bar and confronting horizontal projections of other core bars, said core bars being embedded in the crawler main body at equal intervals in a circumferential direction of the crawler so that confronting horizontal projections overlap each other on the bottom side of the crawler main body in the widthwise direction of the core bars, and the confronting horizontal projections between the embedded core bars having tips in a three-dimensionally overlapped state in which the tips overlap each other over a certain length thereof in left and right directions as well as upward and downward directions.

2. A rubber crawler according to claim 1, wherein the tips of some of the horizontal projections of the core bar define recesses and the tips of confronting horizontal projections of adjacent core bars define nipples to enter into the recesses.

3. A rubber crawler according to claim 2, wherein long slender concave grooves are provided on at least one of a grounding face and a nongrounding face of the rubber crawler laterally outside the overlapped portions of the horizontal projections between the core bars embedded in the rubber crawler body, and said concave grooves extend along portions of the rubber crawler in the circumferential direction.

4. A rubber crawler according to claim 3, wherein a rubber layer covers the overlapped portions of the horizontal projections between the core bars embedded in the rubber crawler body, the rubber layer being partially absent on at least one of the grounding face and the nongrounding face at the overlapped portions of the horizontal projections so that the overlapped portions of the horizontal projections are exposed.

5. A rubber crawler according to claim 3, wherein a rubber layer covers the overlapped portions of the horizontal projections between the core bars embedded in the rubber crawler body, the rubber layer being absent from first portions of at least one of the grounding face and the nongrounding face at the overlapped portions of the horizontal projections, a thinner rubber layer covering said first portions.

6. A rubber crawler according to claim 2 wherein a rubber layer covers the overlapped portions of the horizontal projections between the core bars embedded in the rubber crawler body, the rubber layer being absent from first portions of at least one of the grounding face and the nongrounding face at the overlapped portions of the horizontal projections, a thinner rubber layer covering said first portions.

7. A rubber crawler according to claim 2, wherein a rubber layer covers the overlapped portions of the horizontal projections between the core bars embedded in the rubber crawler body, the rubber layer being partially absent on at least one of the grounding face and the nongrounding face at the overlapped portions of the horizontal projections so that the overlapped portions of the horizontal projections are exposed.

8. A rubber crawler according to claim 2, wherein the engaging part of each core bar is thicker than the wing portions and has a portion extending lower than the wing portions, the horizontal projections being positioned on the portion of the engaging port extending lower than the wing portions.

9. A rubber crawler according to claim 8, wherein long slender concave grooves are provided on at least one of a grounding face and a nongrounding face of the rubber crawler laterally outside the overlapped portions of the horizontal projections between the core bars embedded in the rubber crawler body, and said concave grooves extend along portions of the rubber crawler in the circumferential direction.

10. A rubber crawler according to claim 9, wherein a rubber layer covers the overlapped portions of the horizontal projections between the core bars embedded in the rubber crawler body, the rubber layer being partially absent on at least one of the grounding face and the nongrounding face at the overlapped portions of the horizontal projections so that the overlapped portions of the horizontal projections are exposed.

11. A rubber crawler according to claim 9 wherein a rubber layer covers the overlapped portions of the horizontal projections between the core bars embedded in the rubber crawler body, the rubber layer being absent from first portions of at least one of the grounding face and the nongrounding face at the overlapped portions of the horizontal projections, a thinner rubber layer covering said first portions.

12. A rubber crawler according to claim 8, wherein a rubber layer covers the overlapped portions of the horizontal projections between the core bars embedded in the rubber crawler body, the rubber layer being partially absent on at least one of the grounding face and the nongrounding face at the overlapped portions of the horizontal projections so that the overlapped portions of the horizontal projections are exposed.

13. A rubber crawler according to claim 8, wherein a rubber layer covers the overlapped portions of the horizontal projections between the core bars embedded in the rubber crawler body, the rubber layer being absent from first portions of at least one of the grounding face and the nongrounding face at the overlapped portions of the horizontal projections, a thinner rubber layer covering said first portions.

14. A rubber crawler according to claim 1, wherein long slender concave grooves are provided on at least one of a grounding face and a nongrounding face of the rubber crawler laterally outside the overlapped portions of the horizontal projections between the core bars embedded in the rubber crawler body, and said concave grooves extend along portions of the rubber crawler in the circumferential direction.

15. A rubber crawler according to claim 14, wherein a rubber layer covers the overlapped portions of the horizontal projections between the core bars embedded in the rubber crawler body, the rubber layer being partially absent on at least one of the grounding face and the nongrounding face at the overlapped portions of the horizontal projections so that the overlapped portions of the horizontal projections are exposed.

16. A rubber crawler according to claim 14, wherein a rubber layer covers the overlapped portions of the horizontal projections between the core bars embedded in the rubber crawler body, the rubber layer being absent from first portions of at least one of the grounding face and the nongrounding face at the overlapped portions of the horizontal projections, a thinner rubber layer covering said first portions.

17. A rubber crawler according to claim 1 wherein a rubber layer covers the overlapped portions of the horizontal projections between the core bars embedded in the rubber crawler body, the rubber layer being partially absent on at least one of the grounding face and the nongrounding face at the overlapped portions of the horizontal projections so that the overlapped portions of the horizontal projections are exposed.

18. A rubber crawler according to claim 1, wherein the tips of some of the horizontal projections are concave and the tips of the confronting horizontal projections on adjacent core bars are convex, so as to enable a three-dimensionally overlapped state with each other between the embedded core bars.

19. A rubber crawler according to claim 18, wherein long slender concave grooves are provided on at least one of a grounding face and a nongrounding face of the rubber crawler laterally outside the overlapped portions of the horizontal projections between the core bars embedded in the rubber crawler body, and said concave grooves extend along portions of the rubber crawler in the circumferential direction.

20. A rubber crawler according to claim 19, wherein a rubber layer covers the overlapped portions of the horizontal projections between the core bars embedded in the rubber crawler body, the rubber layer being partially absent on at least one of the grounding face and the nongrounding face at the overlapped portions of the horizontal projections so that the overlapped portions of the horizontal projections are exposed.

21. A rubber crawler according to claim 19, wherein a rubber layer covers the overlapped portions of the horizontal projections between the core bars embedded in the rubber crawler body, the rubber layer being absent from first portions of at least one of the grounding face and the nongrounding face at the overlapped portions of the horizontal projections, a thinner rubber layer covering said first portions.

22. A rubber crawler according to claim 18, wherein the engaging part of each core bar is thicker than the wing portions and has a portion extending lower than the wing portions, the horizontal projections being positioned on the portion of the engaging port extending lower than the wing portions.

23. A rubber crawler according to claim 22, wherein a rubber layer covers the overlapped portions of the horizontal projections between the core bars embedded in the rubber crawler body, the rubber layer being absent from first portions of at least one of the grounding face and the nongrounding face at the overlapped portions of the horizontal projections, a thinner rubber layer covering said first portions.

24. A rubber crawler according to claim 22, wherein a rubber layer covers the overlapped portions of the horizontal projections between the core bars embedded in the rubber crawler body, the rubber layer being partially absent on at least one of the grounding face and the nongrounding face at the overlapped portions of the horizontal projections so that the overlapped portions of the horizontal projections are exposed.

25. A rubber crawler according to claim 22, wherein long slender concave grooves are provided on at least one of a grounding face and a nongrounding face of the rubber crawler laterally outside the overlapped portions of the horizontal projections between the core bars embedded in the rubber crawler body, and said concave grooves extend along portions of the rubber crawler in the circumferential direction.

26. A rubber crawler according to claim 25, wherein a rubber layer covers the overlapped portions of the horizontal projections between the core bars embedded in the rubber crawler body, the rubber layer being partially absent on at least one of the grounding face and the nongrounding face at the overlapped portions of the horizontal projections so that the overlapped portions of the horizontal projections are exposed.

27. A rubber crawler according to claim 25, wherein a rubber layer covers the overlapped portions of the horizontal projections between the core bars embedded in the rubber crawler body, the rubber layer being absent from first portions of at least one of the grounding face and the nongrounding face at the overlapped portions of the horizontal projections, a thinner rubber layer covering said first portions.

28. A rubber crawler according to claim 18, wherein a rubber layer covers the overlapped portions of the horizontal projections between the core bars embedded in the rubber crawler body, the rubber layer being partially absent on at least one of the grounding face and the nongrounding face at the overlapped portions of the horizontal projections so that the overlapped portions of the horizontal projections are exposed.

29. A rubber crawler according to claim 18, wherein a rubber layer covers the overlapped portions of the horizontal projections between the core bars embedded in the rubber crawler body, the rubber layer being absent from first portions of at least one of the grounding face and the nongrounding face at the overlapped portions of the horizontal projections, a thinner rubber layer covering said first portions.

30. A rubber crawler according to claim 1, wherein some of the horizontal projections are L-shaped in transverse cross section and the confronting horizontal projections on adjacent core bars are stick-shaped, so as to enable a three-dimensionally overlapped state with each other between the embedded core bars.

31. A rubber crawler according to claim 30, wherein long slender concave grooves are provided on at least one of a grounding face and a nongrounding face of the rubber crawler laterally outside the overlapped portions of the horizontal projections between the core bars embedded in the rubber crawler body, and said concave grooves extend along portions of the rubber crawler in the circumferential direction.

32. A rubber crawler according to claim 31, wherein a rubber layer covers the overlapped portions of the horizontal projections between the core bars embedded in the rubber crawler body, the rubber layer being partially absent on at least one of the grounding face and the nongrounding face at the overlapped portions of the horizontal projections so that the overlapped portions of the horizontal projections are exposed.

33. A rubber crawler according to claim 31, wherein a rubber layer covers the overlapped portions of the horizontal projections between the core bars embedded in the rubber crawler body, the rubber layer being absent from first portions of at least one of the grounding face and the nongrounding face at the overlapped portions of the horizontal projections, a thinner rubber layer covering said first portions.

34. A rubber crawler according to claim 30, wherein the engaging part of each core bar is thicker than the wing portions and has a portion extending lower than the wing portions, the horizontal projections being positioned on the portion of the engaging port extending lower than the wing portions.

35. A rubber crawler according to claim 34, wherein a rubber layer covers the overlapped portions of the horizontal projections between the core bars embedded in the rubber crawler body, the rubber layer being partially absent on at least one of the grounding face and the nongrounding face at the overlapped portions of the horizontal projections so that the overlapped portions of the horizontal projections are exposed.

36. A rubber crawler according to claim 34, wherein long slender concave grooves are provided on at least one of a grounding face and a nongrounding face of the rubber crawler laterally outside the overlapped portions of the horizontal projections between the core bars embedded in the rubber crawler body, and said concave grooves extend along portions of the rubber crawler in the circumferential direction.

37. A rubber crawler according to claim 34, wherein a rubber layer covers the overlapped portions of the horizontal projections between the core bars embedded in the rubber crawler body, the rubber layer being absent from first portions of at least one of the grounding face and the nongrounding face at the overlapped portions of the horizontal projections, a thinner rubber layer covering said first portions.

38. A rubber crawler according to claim 36, wherein a rubber layer covers the overlapped portions of the horizontal projections between the core bars embedded in the rubber crawler body, the rubber layer being partially absent on at least one of the grounding face and the nongrounding face at the overlapped portions of the horizontal projections so that the overlapped portions of the horizontal projections are exposed.

39. A rubber crawler according to claim 36, wherein a rubber layer covers the overlapped portions of the horizontal projections between the core bars embedded in the rubber crawler body, the rubber layer being absent from first portions of at least one of the grounding face and the nongrounding face at the overlapped portions of the horizontal projections, a thinner rubber layer covering said first portions.

40. A rubber crawler according to claim 30, wherein a rubber layer covers the overlapped portions of the horizontal projections between the core bars embedded in the rubber crawler body, the rubber layer being partially absent on at least one of the grounding face and the nongrounding face at the overlapped portions of the horizontal projections so that the overlapped portions of the horizontal projections are exposed.

41. A rubber crawler according to claim 30, wherein a rubber layer covers the overlapped portions of the horizontal projections between the core bars embedded in the rubber crawler body, the rubber layer being absent from first portions of at least one of the grounding face and the nongrounding face at the overlapped portions of the horizontal projections, a thinner rubber layer covering said first portions.

42. A rubber crawler according to claim 1, wherein the engaging part of each core bar is thicker than the wing portions and has a portion extending lower than the wing portions, the horizontal projections being positioned on the portion of the engaging port extending lower than the wing portions.

43. A rubber crawler according to claim 42, wherein long slender concave grooves are provided on at least one of a grounding face and a nongrounding face of the rubber crawler laterally outside the overlapped portions of the horizontal projections between the core bars embedded in the rubber crawler body, and said concave grooves extend along portions of the rubber crawler in the circumferential direction.

44. A rubber crawler according to claim 43, wherein a rubber layer covers the overlapped portions of the horizontal projections between the core bars embedded in the rubber crawler body, the rubber layer being partially absent on at least one of the grounding face and the nongrounding face at the overlapped portions of the horizontal projections so that the overlapped portions of the horizontal projections are exposed.

45. A rubber crawler according to claim 43, wherein a rubber layer covers the overlapped portions of the horizontal projections between the core bars embedded in the rubber crawler body, the rubber layer being absent from first portions of at least one of the grounding face and the nongrounding face at the overlapped portions of the horizontal projections, a thinner rubber layer covering said first portions.

46. A rubber crawler according to claim 42, wherein a rubber layer covers the overlapped portions of the horizontal projections between the core bars embedded in the rubber crawler body, the rubber layer being partially absent on at least one of the grounding face and the nongrounding face at the overlapped portions of the horizontal projections so that the overlapped portions of the horizontal projections are exposed.

47. A rubber crawler according to claim 42, wherein a rubber layer covers the overlapped portions of the horizontal projections between the core bars embedded in the rubber crawler body, the rubber layer being absent from first portions of at least one of the grounding face and the nongrounding face at the overlapped portions of the horizontal projections, a thinner rubber layer covering said first portions.

48. A rubber crawler according to claim 1, wherein a rubber layer covers the overlapped portions of the horizontal projections between the core bars embedded in the rubber crawler body, the rubber layer being absent from first portions of at least one of the grounding face and the nongrounding face at the overlapped portions of the horizontal projections, a thinner rubber layer covering said first portions.

* * * * *